United States Patent
Nakanishi et al.

(10) Patent No.: US 7,211,540 B2
(45) Date of Patent: May 1, 2007

(54) CERAMIC SUPPORT

(75) Inventors: Tomohiko Nakanishi, Kariya (JP);
Kazuhiko Koike, Okazaki (JP);
Tomomi Hase, Kariya (JP)

(73) Assignees: Nippon Soken, Inc., Nishio-shi, Aichi
(JP); Denso Corporation, Kariya,
Aichi-Pref (JP)

( * ) Notice: Subject to any disclaimer, the term of this patent is extended or adjusted under 35 U.S.C. 154(b) by 0 days.

(21) Appl. No.: 10/876,755

(22) Filed: Jun. 28, 2004

(65) Prior Publication Data

US 2005/0003958 A1    Jan. 6, 2005

(30) Foreign Application Priority Data

Jun. 27, 2003  (JP)  ............................. 2003-183985
Mar. 22, 2004  (JP)  ............................. 2004-082490

(51) Int. Cl.
B01J 23/00    (2006.01)
B01J 20/00    (2006.01)
B01J 21/04    (2006.01)

(52) U.S. Cl. .................. 502/309; 502/306; 502/351; 502/415; 502/439

(58) Field of Classification Search .............. 502/407, 502/414, 415, 439, 351, 306, 309, 527.18, 502/527.19, 242; 501/69, 72, 128, 133
See application file for complete search history.

(56) References Cited

U.S. PATENT DOCUMENTS

| | | | | |
|---|---|---|---|---|
| 3,956,186 A | * | 5/1976 | Iwase et al. | ................. 502/263 |
| 4,189,405 A | * | 2/1980 | Knapton et al. | ............... 502/73 |
| 4,708,946 A | * | 11/1987 | Ohata et al. | ................. 502/304 |
| 4,740,429 A | * | 4/1988 | Tsuno | ......................... 428/627 |
| 4,956,329 A | * | 9/1990 | Chao et al. | ................. 502/251 |
| 5,260,249 A | * | 11/1993 | Shiraishi et al. | ............. 502/304 |
| 5,346,722 A | * | 9/1994 | Beauseigneur et al. | ..... 427/300 |
| 5,607,885 A | * | 3/1997 | Ichii et al. | ..................... 501/9 |
| 6,194,083 B1 | * | 2/2001 | Yasuda et al. | ............... 428/615 |
| 6,503,368 B1 | * | 1/2003 | Kholodenko et al. | .. 156/345.51 |
| 6,803,340 B2 | * | 10/2004 | Lee et al. | .................... 502/309 |
| 6,811,868 B2 | * | 11/2004 | Hasegawa et al. | ........... 428/325 |
| 6,887,569 B1 | * | 5/2005 | Kriven et al. | ................. 428/375 |
| 7,067,452 B2 | * | 6/2006 | Tanaka et al. | ............... 502/242 |
| 2003/0045422 A1 | | 3/2003 | Tanaka et al. | |

FOREIGN PATENT DOCUMENTS

EP    1043067 A2 * 10/2000
JP    2002-346383    12/2002

* cited by examiner

*Primary Examiner*—Cam N. Nguyen
(74) *Attorney, Agent, or Firm*—Nixon & Vanderhye P.C.

(57) ABSTRACT

This invention is directed to providing a high-performance ceramic support being capable of realizing early activation of a catalyst due to direct loading while maintaining the excellent properties of the substrate ceramic, and being less susceptible to heat deterioration, by specifying the kind and combination of optimal replacing elements and the replacing amount and the like. A ceramic support comprising a substrate ceramic containing Mg, Al, Si and O as constituent elements are solid-dissolved therein Ti and W as the second component. The proportion of cordierite crystal having solid-dissolved therein W and Ti is 25 mol % or more, whereby a high-performance directly supporting ceramic support is realized.

20 Claims, 4 Drawing Sheets

(a)
POSITIONS OF W AND Ti SOLID-DISSOLVED IN CORDIERITE

(b)

CERAMIC SUPPORT

This application claims priority to JP Application No. 2003-183985, filed 27 Jun. 2003 and JP Application No. 2004-082490 filed 22 Mar. 2004. The entire contents of these applications are incorporated herein by reference.

FIELD OF THE INVENTION

The present invention relates to a ceramic support used as a support for a catalyst in, for example, a catalytic converter for purifying exhaust gas from an automobile engine.

BACKGROUND OF THE INVENTION

A ceramic support widely used for a catalyst is made of cordierite ($2MgO.2Al_2O_3.5SiO_2$) having low thermal expansion and high thermal shock resistance. This ceramic support is generally used as a catalyst body by shaping cordierite into a honeycomb form and, after coating the surface with γ-alumina, loading a noble metal catalyst thereon. The coated layer is formed because the specific surface area of cordierite is small and a necessary amount of catalytic component cannot be supported on the cordierite as it is.

In this way, conventional ceramic supports are used under the condition that γ-alumina having a large specific surface area is coated thereon. However, the coating of the support surface with γ-alumina disadvantageously incurs an increase in the heat capacity due to an increase of the weight. Particularly, in recent years, studies have been made to decrease the heat capacity by making the cell wall of the honeycomb support thinner so as to attain early activation of the catalyst, but this effect is considerably reduced by the formation of the coated layer. Furthermore, the coated layer gives rise to problems such as the thermal expansion coefficient becomes large or the pressure loss increases due to a reduction in the cell opening area.

Accordingly, various studies are being made regarding a ceramic support where a catalytic component can be loaded without forming a coated layer. For example, the specific surface area of cordierite itself can be increased by a method of subjecting the cordierite to an acid treatment and then to a heat treatment, but this method is disadvantageous and impracticable because the crystal lattice of cordierite is destroyed by the acid treatment or the like and the strength is decreased.

On the other hand, Japanese Unexamined Patent Publication (Kokai) No. 2002-346383 proposed a ceramic support where at least one of the elements constituting the substrate ceramic is replaced with an element other than the constituent elements and thereby a catalytic component can be made to be supported directly on the substrate ceramic. In this ceramic support, a catalytic component can be directly supported by chemical bonding and a coated layer for increasing the specific surface area is not necessary. Moreover, because there is no problem of reduction in the strength accompanying an acid treatment or the like, this ceramic support is promising as a support for use in a catalyst, for automobiles, which is required to have durability.

In the ceramic support of Japanese Unexamined Patent Publication (Kokai) No. 2002-346383, an element having a d or an f orbital in its electron orbital can be used as the element for replacing the constituent element of the substrate ceramic. It is considered that the energy level of the element having a d or an f orbital is close to that of a catalytic component and therefore, donation of an electron readily occurs to facilitate the chemical bonding.

However, as a result of studies by the present inventors, the catalytic performance after a heat-endurance test is revealed to greatly vary depending on the kind and combination of replacing elements. Also, the introduction of a replacing element sometimes causes increase in the thermal expansion coefficient and it is keenly demanded to realize early activation while maintaining the properties of the cordierite.

The present invention has been made under these circumstances. An object of the present invention is to obtain a ceramic support where a catalytic component is directly supported by the replacement of element, and to obtain a high-performance ceramic support capable of realizing early activation of a catalyst due to direct loading while maintaining the excellent properties of the substrate ceramic, and being less susceptible to heat deterioration, by specifying the kind and combination of optimal replacing elements, the replacing amount and the like.

SUMMARY OF THE INVENTION

In order to attain the above-described object, in the ceramic support according to a first aspect of the invention, cordierite is used as the substrate ceramic and at least one of the constituent elements thereof is replaced by W and Ti which are second component elements other than the constituent elements. Furthermore, the proportion of cordierite crystal having solid-dissolved therein W and Ti is 25 mol % or more, whereby a high-performance directly supporting ceramic support is realized.

W as the second component element strongly bonds to a catalytic component supported, but the amount of W alone solid-dissolved in the cordierite is small and a satisfactory increase in the catalytic properties cannot be expected. Therefore, in the present invention, a combination of W with another element was studied and it was found that the combination of W and Ti is most effective. Ti introduced as the second component element together with W has the action of accelerating the solid dissolution of W in the cordierite and also accelerating the production of cordierite crystal. Here, when the proportion of the cordierite crystal having solid-dissolved therein W and Ti in the entire substrate is 25 mol % or more, a sufficiently large amount of a catalytic component can be directly supported by chemical bonding and a good effect of preventing heat deterioration is obtained. In turn early activation of a catalyst by direct loading and high heat durability can be realized while maintaining the excellent properties of the cordierite.

In the ceramic support according to a second aspect of the invention, the proportion of cordierite crystal having solid-dissolved therein W and Ti is 30 mol % or more.

Preferably, the proportion of the cordierite crystal having dissolved therein W and Ti in the entire substrate can be made 30 mol % or more by adjusting, for example, the replacing amounts or ratio of W and Ti. With this proportion, a larger amount of catalytic component can be directly supported by chemical bonding and, at the same time, the effect of preventing heat deterioration is increased. Furthermore, by increasing the amount of cordierite crystal having low thermal expansion, the effect of preventing an increase of thermal expansion coefficient is increased and the catalytic properties are greatly enhanced.

In the ceramic support according to a third aspect of the invention, the solid dissolution percentage of W in the cordierite crystal is 0.5 atm % or more.

Preferably, when the solid dissolution percentage of W in the cordierite crystal is 0.5 atm % or more, a larger amount of catalytic component can be directly supported by chemical bonding and, at the same time, the catalyst can be protected from heat deterioration, maintained to a particle size of 10 nm or less and enhanced in the catalytic properties. The solid dissolution percentage of W can be adjusted by varying, for example, the replacing amounts or ratio of W and Ti.

In the ceramic support according to a fourth aspect of the invention, the solid dissolution percentage of W in the cordierite crystal is from 1.0 to 8.0 atm %.

More preferably, when the solid dissolution percentage of W in the cordierite crystal is 1.0 atm % or more, a still larger amount of a catalytic component can be directly supported by chemical bonding and, at the same time, the catalyst can be prevented from heat deterioration and greatly enhanced in the catalytic properties. Also, when the solid dissolution percentage of W is 8.0 atm % or less, a stable cordierite crystal structure can be obtained and therefore, a catalyst support having low thermal expansion can be realized.

In the ceramic support according to a fifth aspect of the invention, the replacing amount of Ti for the constituent element of cordierite is from 1 to 8 times the replacing amount of W.

The solid dissolution percentage of W or the proportion of cordierite crystal can be adjusted, for example, by the replacing amounts or ratio of W and Ti. In order to increase the amount of solid-dissolved W, the ratio of the replacing amount of Ti to the replacing amount of W is suitably 1 times or more. As the ratio is higher, the solid dissolution percentage of W tends to increase. However, when W reaches its solid dissolution limit, the solid dissolution percentage does not increase any more. Usually, by setting the replacing amount of Ti to from 1 to 8 times the replacing amount of W, desired catalytic properties can be obtained.

In the ceramic support according to a sixth aspect of the invention, the solid dissolution percentage of Ti in the cordierite crystal is from 1 to 3 times the solid dissolution percentage of W.

When the ratio between the replacing amounts of W and Ti is in the range of previously described the fifth aspect, the solid dissolution percentage of Ti in the cordierite crystal is usually from 1 to 3 times the solid dissolution percentage of W and within this range, good catalytic properties can be obtained.

DETAILED DESCRIPTION

The present invention is described in detail below. The ceramic support of the present invention is a directly supporting ceramic support where the substrate ceramic is cordierite and at least one of the constituent elements thereof is replaced by second component elements other than the constituent elements so as to enable direct loading of a catalytic component such as noble metal catalyst. In the ceramic support of the present invention, W and Ti are used as the second component elements and the proportion of cordierite crystal having solid-dissolved therein W and Ti is 25 mol % or more, preferably 30 mol % or more. The ceramic support is not particularly limited in the shape and may have various shapes according to use, such as honeycomb, foam, hollow yarn, fiber, powder and pellet. Examples of the use include a support for a catalyst used in a catalytic converter for purifying exhaust gas from automobiles and the like.

The cordierite used as the substrate ceramic has a theoretical composition represented by $2MgO.2Al_2O_3.5SiO_2$ and because of its low thermal expansion and excellent thermal shock resistance, it is suitable as a support for exhaust gas-purifying catalysts which are required to have high temperature durability. However, a catalytic component can be hardly supported on the cordierite surface by physical adsorption or the like and in the present invention, the catalytic component is bonded to a second component element introduced into the cordierite composition.

The optimal second component element is a combination of W and Ti. The second component element is suitably an element having a higher bonding force to a catalytic component such as noble metal catalyst than the constituent elements (Mg, Al, Si) of cordierite used as the substrate ceramic and being capable of chemically bonding to the catalytic component. More specifically, an element having an empty orbital in its electron orbital and having two or more oxidation states is suitable. Here, the electron configuration of W is $[Xe]4f^{14}5d^46s^2$ and the electron configuration of Ti is $[Ar]3d^24s^3$. Thus, these elements both have an empty orbital in the d orbital. Also, the oxidation number of W includes II, IV, V, VI and the like and the oxidation number of Ti includes II, III, IV and the like. Thus, these two elements each has two or more oxidation numbers.

The element having an empty orbital in the d orbital is close in the energy level to the catalytic metal element supported and therefore, donation of an electron readily occurs. Also, the element having two or more oxidation numbers readily undergoes the donation of an electron. In particular, W has an energy level close to that of noble metal element and by virtue of bonding due to such donation of an electron, can be strongly bonded to the catalyst without a coated layer. However, the amount of W alone solid-dissolved in the cordierite is small and satisfactory elevation of the catalytic properties cannot be expected. Therefore, in the present invention, introduction of multiple elements was studied and it has been found that the combination of W and Ti gives maximum performance. In this combination, the element bonded to a noble metal catalyst is mainly W, and Ti has an action of accelerating the solid dissolution of W in the cordierite.

When the second component elements are W and Ti, by setting the proportion of cordierite crystal having solid-dissolved therein W and Ti to 25 mol % or more, preferably 30 mol % or more, good catalytic properties can be obtained. If the proportion of cordierite crystal is less than 25 mol %, the bonding site for supporting a catalytic component by chemical bonding decreases to reduce the effect of preventing heat deterioration and the catalytic properties after a heat-endurance test are worsened. Also, the proportion of crystals other than cordierite increases and this gives rise to a reduction in properties as the support and, for example, the thermal expansion coefficient increases. Here, the proportion of cordierite crystal having solid-dissolved therein W and Ti indicates a percentage of cordierite crystal having dissolved therein W and Ti in the entire substrate of the ceramic support.

In this case, the solid dissolution percentage of W in the cordierite crystal is from 0.1 to 8.0 atm % and within this range, a necessary amount of catalytic component can be supported. If the solid dissolution percentage of W in the cordierite crystal is less than 0.1 atm %, the bonding site for supporting the catalytic component by chemical bonding decreases to readily cause heat deterioration and the catalytic properties after a heat-endurance test are worsened. The solid dissolution percentage of W is preferably 0.5 atm % or more, more preferably 1.0 atm % or more, and within this range, the bonding site for supporting a catalytic component by chemical bonding increases. Thus the catalytic component can be prevented from aggregation and is highly dispersed with a particle size of 10 nm or less, whereby the effect of preventing heat deterioration can be elevated. If the solid dissolution percentage of W in the cordierite crystal exceeds 8.0 atm %, a stable cordierite crystal structure where W and T are solid-dissolved cannot be formed and, as a result, the thermal expansion coefficient becomes high and the support is improper as a catalyst support.

Accordingly, in order to obtain optimal catalytic properties, the proportion of cordierite crystal having solid-dissolved therein W and Ti and the solid dissolution percentage of W in the cordierite crystal are adjusted to ensure a necessary supported amount of catalyst without causing decrease in mechanical property (e.g., strength, thermal expansion coefficient), heat resistance, weather resistance and the like of the substrate ceramic. For adjusting the proportion of cordierite crystal, the selection of a starting material is important. The proportion also varies depending on the replacing amounts or ratio of W and Ti. For adjusting the solid dissolution percentage of W, the replacing amounts and ratio of W and Ti are important. Furthermore, since the cordierite can keep the crystal form in a wide composition region, the proportion of cordierite crystal and the solid dissolution percentage of W can also be adjusted by changing the composition within that region.

The ceramic support of the present invention is produced as follows. That is, a starting material is prepared by previously subtracting the amount of the constituent element (Mg, Al, Si) corresponding the amount to be replaced by the second component element from raw material constituting a theoretical composition of cordierite and, to the resulting raw material, compounds comprising the second component elements (W, Ti) are added according to respective replacing amounts. This ceramic raw material is kneaded, shaped and dried by an ordinary method and then fired in air. Alternatively, starting material which is prepared by previously subtracting the amount of the constituent element (Mg, Al, Si) corresponding the amount to be replaced by the second component element from raw material constituting a theoretical composition of cordierite may be kneaded, shaped and dried by an ordinary method, then dipped in a solution containing compounds for the second component elements (W, Ti), and then subjected to drying and firing in air.

As for the raw materials of cordierite, specifically, clay minerals such as talc are preferably used as the Mg source, and alumina and aluminum hydroxide are preferably used as the Al source. The Si source generally used is kaolin, but an amorphous silicon oxide, for example, fused silica is preferred. When an amorphous silicon oxide is used as the starting material, this brings an effect of preventing the production of crystals other than the objective cordierite to increase the proportion of cordierite crystal and also brings an effect of decreasing the thermal expansion coefficient.

In order to increase the solid dissolution percentage of the second component element W in cordierite, the replacing amount of Ti is preferably from 1 to 8 times the replacing amount of W. In general, when the replacing amount of Ti is increased, the solid dissolution percentage of W tends to also increase, but the solid dissolution percentage is saturated at a certain replacing amount or more. Accordingly, the replacing amount of Ti is more preferably from 1 times to less than 7 times the replacing amount of W. At this time, the solid dissolution percentage of Ti in the cordierite crystal is usually from 1 to 3 times the solid dissolution percentage of W and within this range, good catalytic properties can be obtained. The solid dissolution percentage of W and the proportion of cordierite crystal fluctuate according to the replacing amounts and ratio of Ti and W and therefore, the solid dissolution percentage of W and the proportion of cordierite crystal are preferably adjusted by appropriately setting the replacing amounts and ratio of Ti and W so as to obtain optimal catalytic properties.

As for the constituent component other than the cordierite crystal(phases other than cordierite), $TiO_2$, $MgWO_4$, $WO_3$ and the like are produced. For example, W not trapped in the crystal lattice of cordierite, or Al, Mg or Si left over at the formation of crystal lattice of cordierite are oxidized or converted into a composite oxide and the resulting compound forms phases other than cordierite and remains in the matrix phase comprising cordierite having solid-dissolved therein Ti and W. When the ceramic support is measured by X-ray diffraction, it can be verified that a cordierite (matrix phase) having solid-dissolved therein Ti and W and phases not containing cordierite are present.

The ceramic support of the present invention obtained in this way bonds to a catalytic component by a strong force and provides a direct supporting support less susceptible to heat deterioration and having a low thermal expansion coefficient (usually $2.0 \times 10^{-6}/°$ C. or less) and high performance. Examples of the catalytic component which is suitably supported on this ceramic support include noble metal elements such as Pt, Rh, Pd, Ru, Au, Ag, Ir and In. At least one or more member selected from these noble metal elements is used. If desired, various co-catalysts can also be added. Examples of the co-catalyst include metal elements such as Hf, Ti, Cu, Ni, Fe, Co, W, Mn, Cr, V, Se, Rb, Sr, Y, Zr, Nb, Mo, Tc, Ru, Sc, Ba, Ka and lanthanoid element (e.g., La, Ce, Pr, Nd, Pm, Sm, Eu, Gd, Tb, Dy, Ho, Er, Tm, Yb, Lu), and oxides or composite oxides thereof. According to the purpose such as prevention of deterioration, oxygen storage capacity and detection of catalyst deterioration, one or multiple member(s) selected from these elements is(are) used.

Such a catalytic component is usually loaded on the ceramic support of the present invention by a method of dipping the ceramic support in a solution containing a desired catalytic component, and drying and then firing it. In the case of using two or more catalytic components in combination, a solution containing a plurality of catalytic components is prepared and the ceramic support is dipped in the solution. For example, in the case of using Pt and Rh as the main catalytic components, a solution containing hydrogen hexachloroplatinate hexahydrate and rhodium chloride trihydrate may be used. Also, various co-catalytic components may be used together. Usually, the amount of the catalytic component supported is preferably from 0.05 to 10 g/L for the catalyst noble metal and from 1 to 250 g/L for the co-catalyst.

EXAMPLES

(Examples 1 to 9 and Comparative Examples 1 to 7)

In order to confirm the effect of the present invention, a ceramic support of the present invention, where the constituent component of cordierite was replaced by second component elements W and Ti, was produced by the following method. Talc, fused silica, alumina and aluminum hydroxide were used as raw materials for the formation of cordierite and after replacing 10% of the Si source with W (first replacing element) and 50% of the same Si source with Ti (second replacing element), the powders of these starting materials were mixed to approximate to the theoretical composition point of cordierite. Thereafter, a binder, a lubricant, a humectant and the like each in an appropriate amount were added to the resulting mixed raw material and kneaded by an ordinary method and the kneaded raw material was shaped into a honeycomb form having a cell wall of 100 μm, a cell density of 400 cpsi (number of cells per square inch) and a diameter of 50 mm. This honeycomb shaped article was dried and fired at 1,260° C. in air to obtain a directly supporting ceramic support of the present invention (Example 1).

For loading a catalyst noble metal as the main catalytic component on the thus-obtained directly supporting ceramic support, the ceramic support was dipped in an aqueous solution having dissolved therein 0.035 mol/L of hydrogen hexachloroplatinate hexahydrate and 0.025 mol/L of rhodium chloride trihydrate for 5 minutes and after removing the excess solution, dried and then metallized by firing at 600° C. in an air atmosphere. The amount of the catalyst supported was Pt/Rh=1.0/0.2 g/L.

The obtained ceramic catalyst body was measured on the purification performance and the thermal expansion coefficient and the results are shown in Table 1. As for the purification performance, the 50% purification temperature (fresh catalyst T50) of propylene ($C_3H_6$) was measured under the following evaluation conditions. The 50% purification temperature (T50) is a temperature where the purification percentage of propylene becomes 50% (see, FIG. 1(*b*)). Furthermore, the 50% purification temperature (deteriorated catalyst T50) after a heat-endurance test at 800° C. for 5 hours in air was measured and the difference therebetween was shown as (deteriorated catalyst T50−fresh catalyst T50).

Ceramic support: 35 ml (φ30×L50)
SV: 41,000/hr
Gas composition: A/F=14.55

For the purpose of comparison, ceramic supports using Co, Zr or Ga as the second replacing element in the replacing amount shown in Table 1 were produced (Comparative Examples 1 to 3). Also, ceramic supports using W, Ti or Zr as the first replacing element in the replacing amount shown in Table 1 and not using the second replacing element were produced (Comparative Examples 4 to 6). From these ceramic supports, ceramic catalyst bodies were obtained by loading a catalyst in the same manner as above and measured on the purification performance and the thermal expansion coefficient. The results are shown together in Table 1.

TABLE 1

| | Second Component Element | | | | Results | |
|---|---|---|---|---|---|---|
| | First Replacing Element | Replacing Ratio (%) | Second Replacing Element | Replacing Ratio (%) | Deteriorated Catalyst T50-Fresh Catalyst T50 (° C.) | Thermal Expansion Coefficient (×10$^{-6}$/° C.) |
| Example 1 | W | 10 | Ti | 50 | 0 | 1.0 |
| Comparative Example 1 | W | 30 | Co | 30 | 15 | 3.6 |
| Comparative Example 2 | W | 20 | Zr | 20 | 100 | 2.4 |
| Comparative Example 3 | W | 30 | Ga | 30 | 120 | 6.0 |
| Comparative Example 4 | Ti | 30 | — | — | 80 | 2.0 |
| Comparative Example 5 | Zr | 30 | — | — | 60 | 1.8 |
| Comparative Example 6 | W | 10 | — | — | 30 | 0.8 |

As is apparent from Table 1, in the case of not using the second replacing element, the ceramic catalyst body of Comparative Example 6 using W as the first replacing element is highest in the purification performance and also low in the thermal expansion coefficient. However, when a second replacing element is combined with this, depending on the kind of second replacing element, the purification performance rather decreases or the thermal expansion coefficient increases (Comparative Examples 1 to 3). On the other hand, in Example 1 using W and Ti in combination, the 50% purification temperature is not changed between before and after the a heat-endurance test and, moreover, the thermal expansion coefficient is 1.0×10$^{-6}$/° C., revealing that a low thermal-expansion ceramic support less susceptible to heat deterioration is provided.

Then, using W and Ti as the second component element, the difference in the effect depending on the replacing amounts and ratio of W and Ti and the starting material as the Si source was examined. Ceramic supports were produced in the same manner as in Example 1 by changing the replacing amounts and ratio of W and Ti as shown in Table 2 (Examples 2 to 4 and Examples 8 and 9). Also, ceramic supports were produced in the same manner by using kaolin in place of fused silica for the starting material as the Si source and changing the replacing amounts and ratio of W and Ti as shown in Table 2

(Examples 5 to 7)

Furthermore, for the purpose of comparison, a ceramic support using only W as the second component element and using kaolin for the starting material as the Si source was produced (Comparative Example 7)

The thus-obtained directly supporting ceramic supports were measured on the proportion of cordierite crystal having solid-dissolved therein W and Ti and the solid dissolution percentage of W in the cordierite and the results are shown in Table 2. The proportion of cordierite crystal was measured by the X-ray diffraction method. At this time, a sample where cordierite as the main component and TiO$_2$ as the component of phases other than cordierite were mixed at an arbitrary ratio was first prepared and a calibration curve was constructed by measuring the peak intensity of each component. Then, samples of Examples 1 to 9 and Comparative Example 7 each was measured under the same conditions and the proportion of cordierite crystal was determined from the calibration curve constructed. The measurement conditions were as follows.

Measurement Conditions:
Tube voltage: 50 KV, tube current: 200 mA, and room temperature.
The solid dissolution percentage of W was measured by TEM-EDX. More specifically, samples of Examples 1 to 9 and Comparative Example 7 each was ground, observed by TEM (transmission electron microscope) and then subjected to quantitative analysis by EDX and the obtained W concentration was used as the solid dissolution percentage of W.

TABLE 2

|  | Starting Material as Si Source | Replacing Amount of W (%) | Replacing Amount of Ti (%) | Ratio of W and Ti | Proportion of Cordierite Crystal (mol %) | Solid Dissolution Percentage of W (atm %) |
|---|---|---|---|---|---|---|
| Example 1 | fused silica | 10 | 50 | 5 | 50 | 1.5 |
| Example 2 | fused silica | 10 | 10 | 1 | 55 | 0.8 |
| Example 3 | fused silica | 5 | 5 | 1 | 60 | 0.5 |
| Example 4 | fused silica | 10 | 30 | 3 | 53 | 1.0 |
| Example 5 | kaolin | 10 | 50 | 5 | 25 | 1.0 |
| Example 6 | kaolin | 10 | 10 | 1 | 30 | 0.5 |
| Example 7 | kaolin | 10 | 30 | 3 | 28 | 0.8 |
| Comparative Example 7 | kaolin | 30 | — | — | 20 | 0.2 |
| Comparative Example 8 | fused silica | 10 | 70 | 7 | 40 | 1.5 |
| Comparative Example 9 | fused silica | 10 | 80 | 8 | 30 | 1.5 |

As is apparent from Table 2, in Comparative Example 7 using only W as the second component element, even when the replacing amount is 30%, the proportion of cordierite crystal is as low as 20 mol % and the solid dissolution percentage of W is only 0.2 atm %. On the other hand, in all of Examples 1 to 9 using W and Ti in combination, the proportion of cordierite crystal is 25 mol % or more and the solid dissolution percentage of W is as high as 0.5 atm %. Furthermore, the proportion of cordierite crystal increases when fused silica is used for the starting material as Si source, and a cordierite crystal proportion as high as 30 mol % or more is obtained when the ratio of replacing amounts (W/Ti) is in the range of 1 to 8. This effect is clearly seen when compared with the case where the replacing amounts and ratio are the same but kaolin is used for the starting material as the Si source. For example, when the ratio (W/Ti) between the replacing amounts of W and Ti is from 1 to 5, the proportion of cordierite crystal is from 25 to 30 mol % in Examples 5 to 7, whereas the proportion of cordierite crystal is almost doubled to 53 to 55 mol % in Examples 1, 2 and 4.

Also, as seen from results in Examples 1 to 7, there is a tendency that as the replacing amounts of W and Ti are larger and the ratio (W/Ti) between the replacing amounts of W and Ti is higher, the solid dissolution percentage of W in cordierite becomes higher. For example, in Example 3 where the replacing amounts of W and Ti each is 5%, the solid dissolution percentage of W is 0.5 atm %, whereas in Example 2 where the replacing amounts of W and Ti each is 10%, the solid dissolution percentage of W is 0.8 atm % and in Example 1 where the replacing amounts of W and Ti are 10% and 50%, respectively, the solid dissolution percentage of W is greatly increased to 1.5 atm %. However, in Examples 8 and 9 where the ratio (W/Ti) of replacing amounts is exceeding 5, the solid dissolution percentage of W is not increased. This was considered to be because W reached the solid dissolution limit. In Examples 8 and 9, the proportion of cordierite crystal is lower than that in Example 1. Accordingly, the ratio (W/Ti) of replacing amounts is preferably less than 7.

Figure 1A:
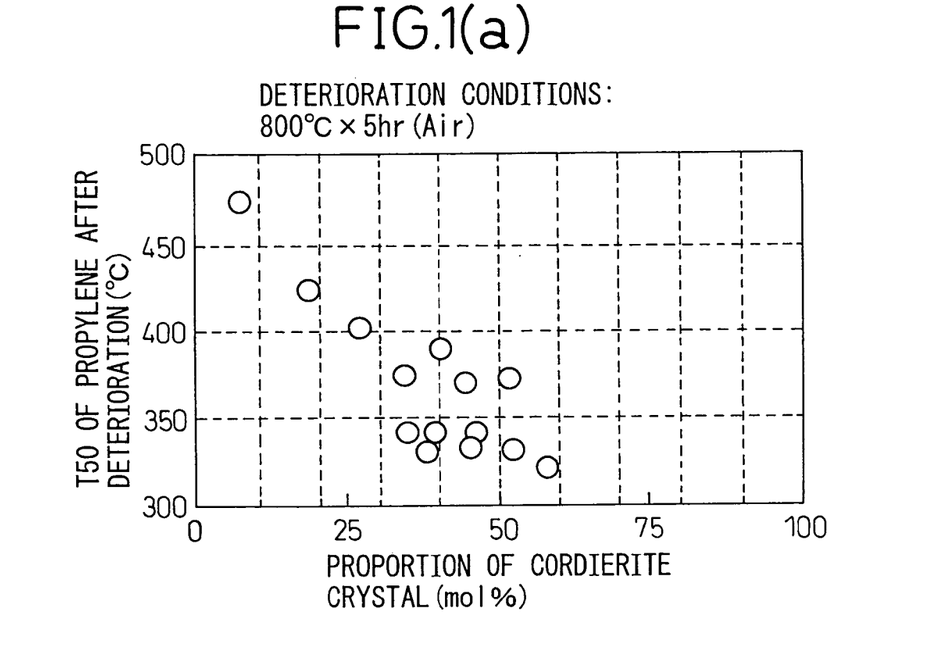
FIG. 1(a) is a diagram showing the relationship between the proportion of cordierite crystal and the 50% purification temperature after a heat-endurance test and FIG. 1(b) is a diagram for describing the method of measuring the 50% purification temperature.
Figure 1B:
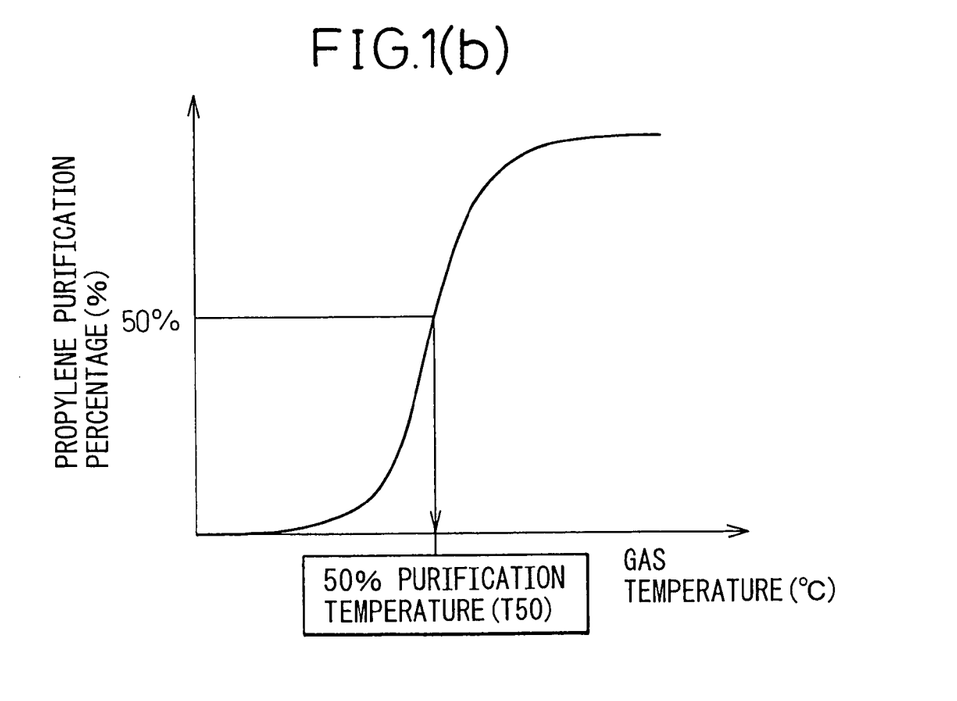
Figure 2:
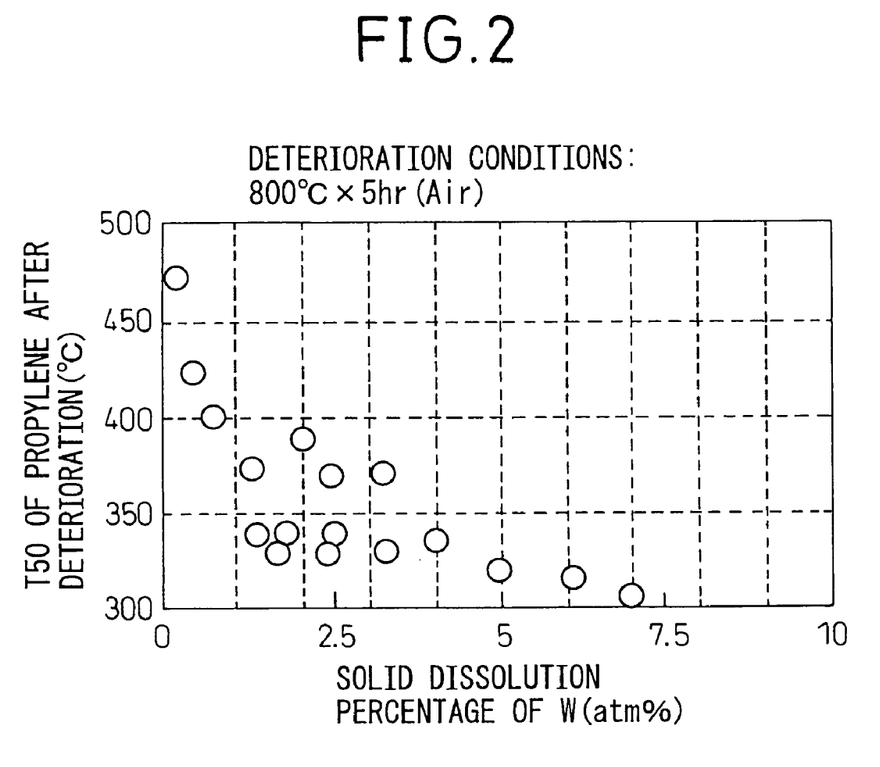
FIG. 2 is a diagram showing the relationship between the solid dissolution percentage of W and the 50% purification temperature after heat endurance test.

In this way, the proportion of cordierite crystal can be increased or decreased by changing, for example, the replacing amounts or ratio (W/Ti) of W and Ti, or the starting material. FIG. 1(a) shows the results when various ceramic supports were produced as above and the purification performance after a heat-endurance test was measured, and shows that as the proportion of cordierite crystal increases, the 50% purification temperature (T50) after heat deterioration becomes lower. As seen from FIG. 1(a), when the proportion of cordierite crystal is 25 mol % or more, the 50% purification temperature (T50) after heat deterioration is about 400° C. and the catalyst body has a sufficiently high performance in practice. When the proportion of cordierite crystal is 30 mol % or more, the 50% purification temperature (T50) after heat deterioration is about 380° C. or less and this is more effective in preventing heat deterioration. FIG. 2 shows the results when ceramic supports were prepared by varying the solid dissolution percentage of W and the purification performance after a heat-endurance test was measured, and shows that when the solid dissolution percentage of W is 0.5 atm % or more, the 50% purification temperature (T50) after heat deterioration is about 400° C. and the catalyst body has sufficiently high performance in practice. When the solid dissolution percentage of W is 1.0 atm % or more, the 50% purification temperature (T50) after heat deterioration is about 380° C. or less and this is more preferred.

Figure 3:
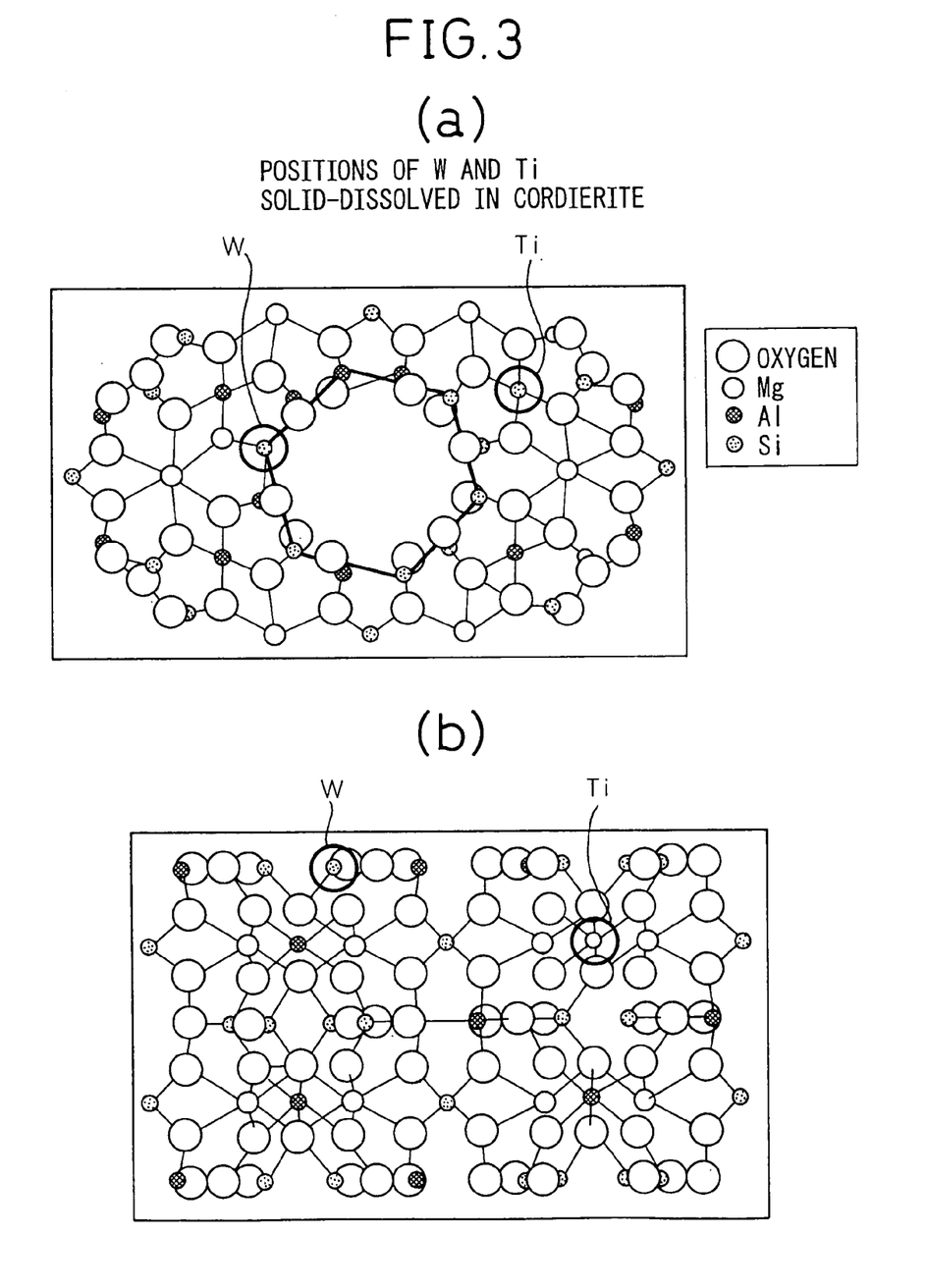
FIG. 3a and FIG. 3b are views showing the examples of a cordierite crystal structure where W and Ti are solid-dissolved.

FIGS. 3(a) and 3(b) each shows an example of cordierite crystal structure having dissolved therein W and Ti (when the solid dissolution percentage of W is 2.3 atm %). In each of Examples above, it was confirmed by TEM-EDX analysis that W and Ti were solid-dissolved and, at this time, the solid dissolution ratio of W and Ti was from 1 to 3 (W/Ti). The solid dissolution ratio is in this range also when the ratio (W/Ti) between replacing amounts of W and Ti is 5, and it is understood that W is more readily solid-dissolved than Ti.

Figure 4:
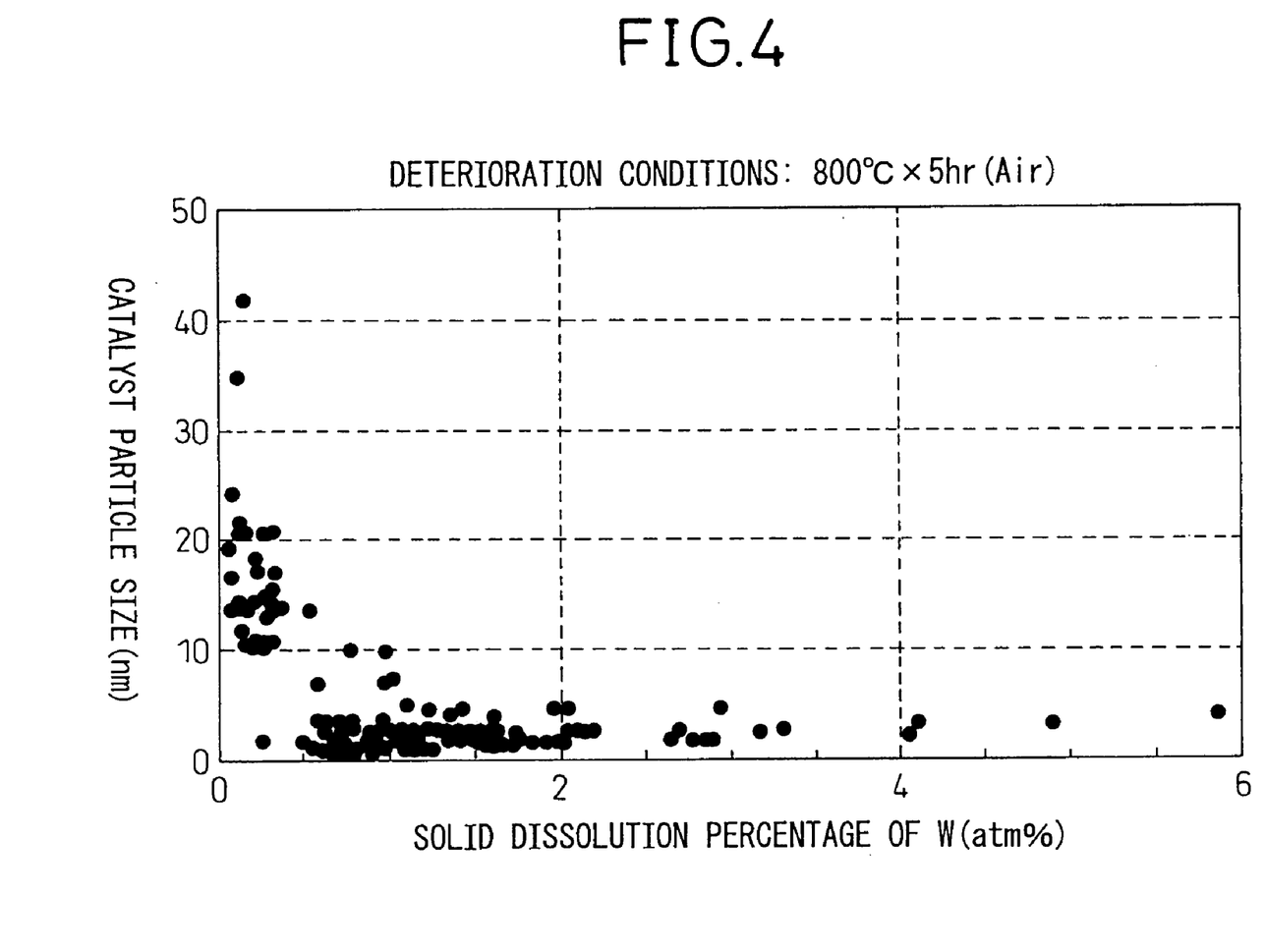
FIG. 4 is a diagram showing the relationship between the solid dissolution percentage of W and the catalyst particle size after heat endurance test.

FIG. 4 shows the results when ceramic supports were produced by changing the solid dissolution percentage of W as stated above and the change of catalyst particle size after a heat-endurance test was measured. As shown in this Figure, when the solid dissolution percentage of W is less than 0.5 atm %, the catalyst particle size is from 10 to 25 nm or larger than this range and it is presumed that, due to the small number of bonding sites, heat deterioration readily occurs. On the other hand, when the solid dissolution percentage of W is 0.5 atm % or more, the catalyst particle size after heat deterioration can be made to 10 nm or less. When the solid dissolution percentage of W is 1.0 atm % or more, the catalyst particle size after heat deterioration can be made to 5 nm or less and this is more preferred.

As stated above, according to the ceramic support of the present invention, the replacing amounts and ratio of W and Ti as second component elements, the starting material and the like are appropriately selected to optimize the amount of cordierite produced or the solid dissolution percentage of W, whereby a good catalyst support, not undergoing deterioration and with a small amount of catalyst, can be obtained.

What is claimed is:

1. A ceramic support comprising cordierite crystal as a substrate ceramic, wherein at least one of the constituent elements of the cordierite crystal is replaced in the crystal structure with second component elements other than said constituent elements so as the enable direct loading of a catalytic component, and wherein said second component elements are W and Ti, are included in the crystal structure of the cordierite, and the proportion of the cordierite crystal having W and Ti solid-dissolved therein is 25 mol % or more.

2. The ceramic support according to claim 1, wherein the proportion of cordierite crystal having solid-dissolved therein W and Ti is 30 mol % or more.

3. The ceramic support of claim 2 wherein the solid dissolution percentage of W in the cordierite crystal is 0.5 atm % or more.

4. The ceramic support of claim 3 wherein the replacing amount of Ti for the constituent element of the cordierite is from 1 to 8 times the replacing amount of W.

5. The ceramic support of claim 3 wherein the solid dissolution percentage of Ti in the cordierite crystal is from 1 to 3 times the solid dissolution percentage of W.

6. The ceramic support of claim 2 wherein the solid dissolution percentage of Ti in the cordierite crystal is from 1 to 3 times the solid dissolution percentage of W.

7. The ceramic support of claim 2 wherein the solid dissolution percentage of W in the cordierite crystal is from 1.0 to 8.0 atm %.

8. The ceramic support of claim 7 wherein the replacing amount of Ti for the constituent element of the cordierite is from 1 to 8 times the replacing amount of W.

9. The ceramic support of claim 7 wherein the solid dissolution percentage of Ti in the cordierite crystal is from 1 to 3 times the solid dissolution percentage of W.

10. The ceramic support of claim 2 wherein the replacing amount of Ti for the constituent element of the cordierite is from 1 to 8 times the replacing amount of W.

11. The ceramic support of claim 10 wherein the solid dissolution percentage of Ti in the cordierite crystal is from 1 to 3 times the solid dissolution percentage of W.

12. The ceramic support according to claim 1, wherein the solid dissolution percentage of W in the cordierite crystal is 0.5 atm % or more.

13. The ceramic support of claim 12 wherein the replacing amount of Ti for the constituent element of the cordierite is from 1 to 8 times the replacing amount of W.

14. The ceramic support of claim 12 wherein the solid dissolution percentage of Ti in the cordierite crystal is from 1 to 3 times the solid dissolution percentage of W.

15. The ceramic support according to claim 1, wherein the solid dissolution percentage of W in the cordierite crystal is from 1.0 to 8.0 atm %.

16. The ceramic support of claim 15 wherein the replacing amount of Ti for the constituent element of the cordierite is from 1 to 8 times the replacing amount of W.

17. The ceramic support of claim 15 wherein the solid dissolution percentage of Ti in the cordierite crystal is from 1 to 3 times the solid dissolution percentage of W.

18. The ceramic support according to claim 1, wherein the replacing amount of Ti for the constituent element of the cordierite is from 1 to 8 times the replacing amount of W.

19. The ceramic support of claim 18 wherein the solid dissolution percentage of Ti in the cordierite crystal is from 1 to 3 times the solid dissolution percentage of W.

20. The ceramic support according to claim 1, wherein the solid dissolution percentage of Ti in the cordierite crystal is from 1 to 3 times the solid dissolution percentage of W.

* * * * *